United States Patent [19]

Ells et al.

[11] 4,051,688
[45] Oct. 4, 1977

[54] OFFSHORE STRUCTURE AND METHOD

[75] Inventors: John William Ells, Bexleyheath; Ian David Parker, Basingstoke, both of England

[73] Assignee: The British Petroleum Company Limited, London, England

[21] Appl. No.: 692,772

[22] Filed: June 4, 1976

[30] Foreign Application Priority Data

June 13, 1975 United Kingdom .............. 25356/75

[51] Int. Cl.² ............................................. F16L 1/00
[52] U.S. Cl. ...................................... 61/110; 285/24; 228/212
[58] Field of Search .................... 61/110, 111; 285/24, 285/27; 29/49.3

[56] References Cited

U.S. PATENT DOCUMENTS

| 3,267,682 | 8/1966 | Robley | 61/111 |
| 3,670,513 | 6/1972 | Matthews | 61/110 |
| 3,733,676 | 5/1973 | Morgan | 61/111 |
| 3,835,655 | 9/1974 | Oliver | 61/111 |

Primary Examiner—Jacob Shapiro
Attorney, Agent, or Firm—Morgan, Finnegan, Pine, Foley & Lee

[57] ABSTRACT

Method of joining two pipelines underwater by, for example, flanges, involves supporting a first of the pipelines in a frame having supports for holding a second pipeline in alignment with the first pipeline and moving the end of the first pipeline (which is conveniently near an elbow in the pipeline) longitudinally into contact with the second pipeline and joining together.

7 Claims, 12 Drawing Figures

OFFSHORE STRUCTURE AND METHOD

This invention relates to a method of joining together the free ends of two pipelines at an underwater location.

It has been previously proposed to join pipelines by means of bolts through flanges at the ends of the pipeline. For this to be done the flanges must be accurately aligned prior to being bolted together and must be carefully handled to avoid damage which could prevent a fluid tight joint being made. However, performance of the operation especially in deep water over 200 feet, increases the risk of damage to the flanges and a need exists for an improved method of joining flanges underwater.

According to the present invention a method of connecting by means of flanges two pipelines lying on the bottom of a body of water comprises:

a. disposing a first pipeline having a flange at the end thereof so that the end portion of the pipeline is moveable in the direction of its longitudinal axis to provide adjustment for joining the flanges together, b. supporting the first pipeline so that the end thereof is free of the water bottom, c. supporting a second pipeline having a flange at the end thereof free of the water bottom and in alignment with the first pipeline, and d. securing the flanges together in fluid tight relationship.

Preferably the method comprises installing on the water bottom an apparatus, herein referred to as a joining frame, said joining frame having means for supporting the first pipeline and means for supporting the second pipeline in alignment therewith, and, using said joining frame, supporting the first pipeline and supporting the second pipeline in alignment therewith.

Preferably the method comprises lowering the end of the second pipeline onto the joining frame and guiding the second pipeline onto the means for supporting same in alignment with the first pipeline employing guide means on the joining frame.

Conveniently at the start of the method the second pipeline has a closure means on the end thereof and the method comprises supporting the second pipeline in a non aligned position which permits removal of the closure means and removing same.

Conveniently the supporting of the second pipeline in a non aligned position is effected employing a support means on the joining frame.

The method can comprise, prior to installing the joining frame, installing on the water bottom an apparatus, herein referred to as a spool frame, the spool frame having releaseable means for holding the end portion of the first pipeline free of the water bottom in a suitable attitude for installing the joining frame, and employing said spool frame to lift the first pipeline at a position a small distance from the end thereof.

Preferably the spool frame has a hydraulic clamp for holding the first pipeline and the method comprises lowering the spool frame from a surface vessel to the water bottom, and holding the first pipeline by means of the hydraulic clamp and lifting the first pipeline off the water bottom by, for example, employing lifting means on the vessel.

Conveniently the first pipeline has at a small distance from the end thereof a substantially right angle bend such that the end of the pipeline is moveable in the direction of its longitudinal axis by a force in a direction lateral with respect to the pipeline beyond the bend and which comprises installing the spool frame beyond, but close to, the bend.

At the start of the method there is conveniently a gap between the ends e.g. 50 to 500 feet to permit operations to be done to one without risk of damage to the other. It will then be necessary to increase the length of the second pipeline e.g. by welding further pipe thereto, such as conventional lengths of about 40 feet. Since it is extremely difficult to increase the length by welding lengths of pipe above the surface with sufficient accuracy to be sure that when the pipeline is returned to the water bottom its flange will exactly meet the flange on the first pipeline, it is preferred to increase the length of the second pipeline such that the second pipeline will overlap the first pipeline end when returned to the water bottom. Preferably the overlap is less than 40 feet, more preferably as small as possible.

Preferably the second pipeline is returned to the water bottom and its excess length noted e.g. by bringing into near alignment with the first pipeline and marking at an appropriate point, and then lifted to above the surface, the excess length cut off and the flange attached.

If at the start of the method the ends of the pipeline are in overlapping relationship then it will be necessary to remove the excess length of the second pipeline.

Preferably prior to the start of the method the pipelines are arranged so that their axes are parallel, more preferably colinear.

The joining frame can stand on the water bottom, or preferably on a platform hereafter referred to as a working platform which itself stands on the water bottom.

After the flanges have been secured together the spool frame and joining frame are preferably removed and the secured flanges allowed to contact the water bottom.

The second pipeline can be a short length of pipe and can for example be carried by a barge at the start of the method. The present invention therefore provides a method of lengthening an already laid pipeline by effecting a flange connection at the end thereof.

The invention is illustrated by reference to the accompanying drawings which shows the sequence of operations involved in connecting the pipelines together on the sea bed by means of flanges and in which.

Figure 9:
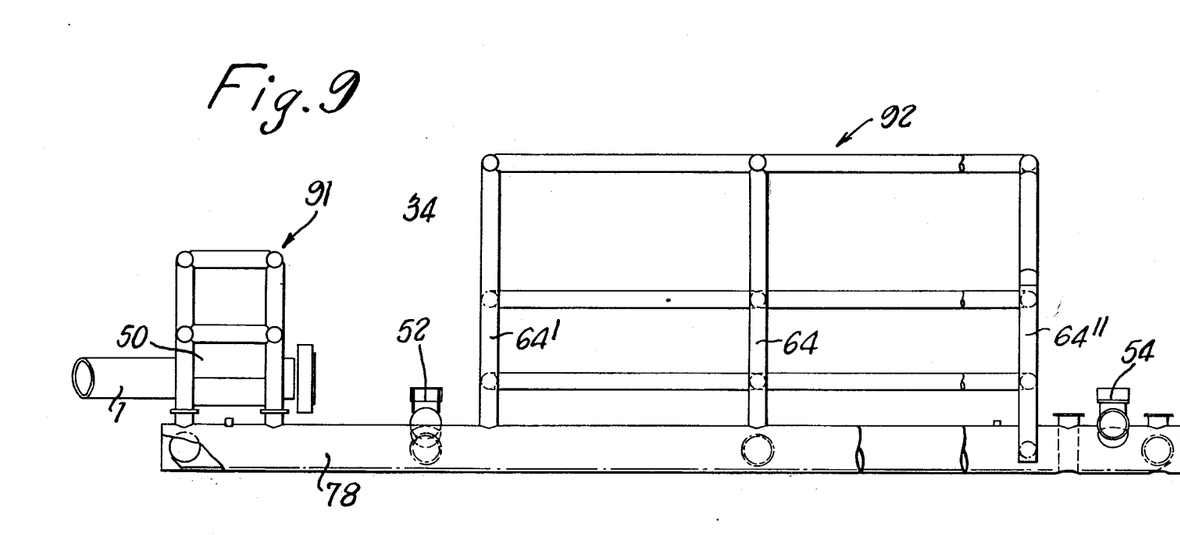
FIG. 9 is a side elevation of the joining frame.
Figure 10:
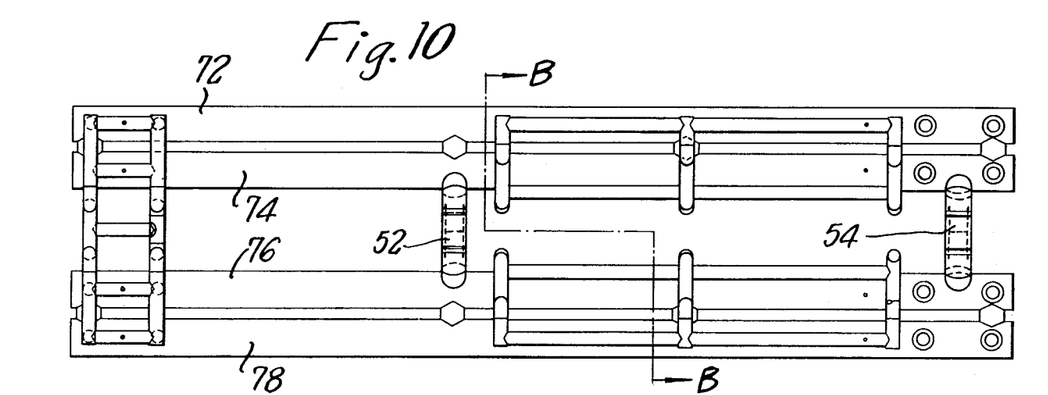
FIG. 10 is a plan view of the joining frame.
Figure 11:
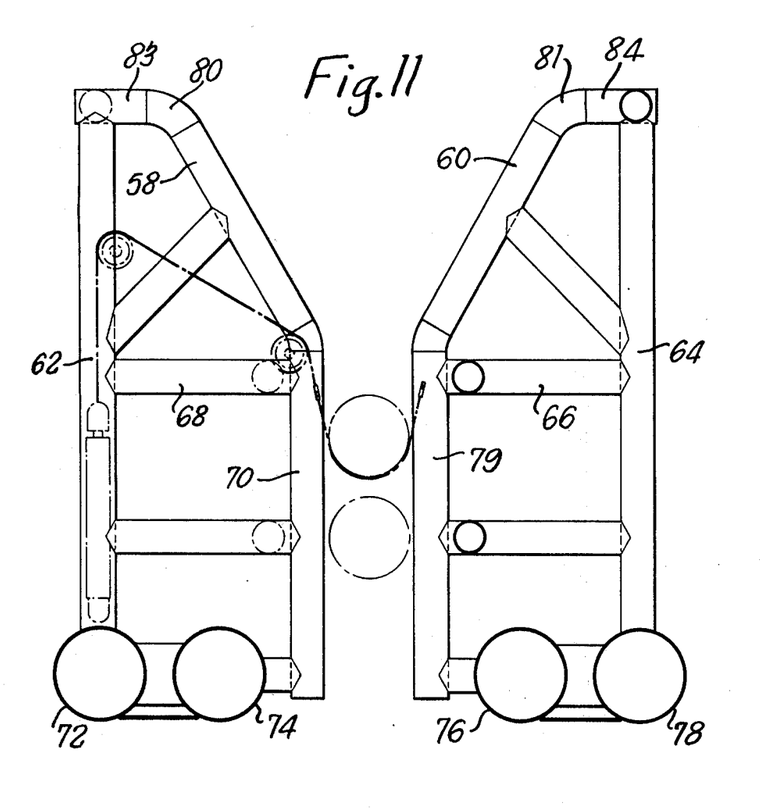
FIG. 11 is a section taken on the line B-B of FIG. 10.

With reference to FIG. 9 the spool frame indicated generally by numeral 34 comprises a clamp 50 shown holding spool piece 1 and two saddle shaped supports 52 and 54 for supporting pipeline 14. The spool frame 34 has two frameworks indicated generally by numerals 91 and 92 for receiving the first and second pipelines respectively. The two frameworks 91 and 92 are joined four relatively large diameter tubular members 72, 74, 76 and 78 lying parallel and horizontal supporting twelve relatively smaller diameter vertical tubular members 62, 70, 79 and 64, 64' and 64" only six of which are shown. Member 70 is held to member 62 by cross bracing 68 and member 64 likewise to member 79 by cross bracing 66. At their upper ends members 70 and 79 are joined to members 58 and 60 which are inclined away from each other to provide a means for guiding pipeline onto the saddle shaped supports 52 and 54. The ends of inclined members 58 and 60 are joined via curved pieces 80 and 81 respectively to short tubular pieces 83 and 84 which are joined to the upper ends of vertical tubular members 62 and 64.

Figure 7:
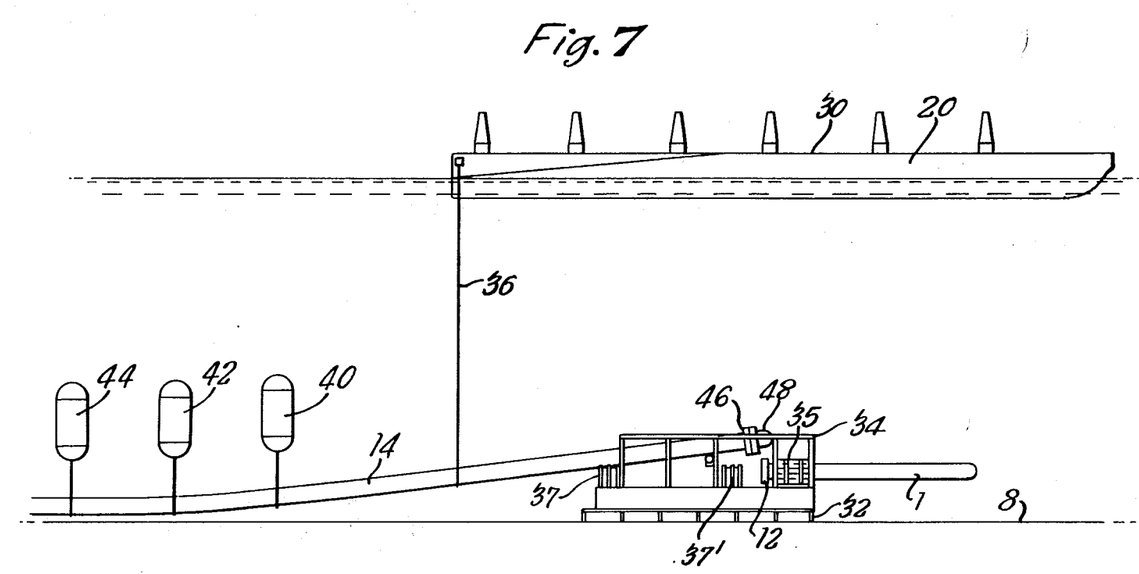
FIG. 7 is a side elevation showing the lowering of the pipeline to the joining frame.

The spool frame 34 has a means (not shown) for temporarily supporting the second pipeline 14 in a non aligned position as shown in FIG. 7 for removing the head 48. The spool frame 34 has a hydraulic clamp 35 for pulling the second pipeline 14 downwardly into the saddle shaped supports against the tendency of its axis to incline slightly upwards.

The method is now described.

Figure 1:
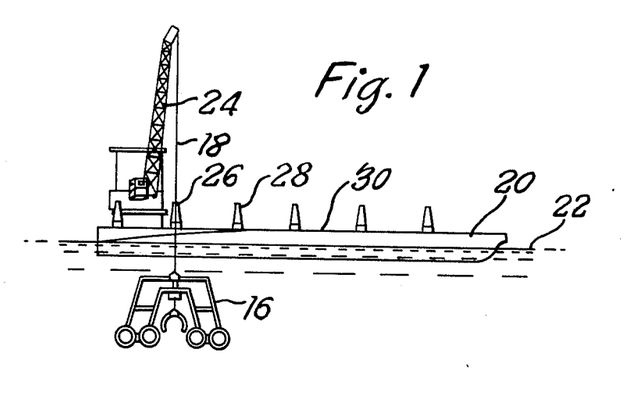
FIG. 1 is a side elevation showing the lowering from a vessel of a frame for supporting a spool piece (which is a length of pipeline lying on the sea bed one end being connected to a riser) herein referred to as the spool frame to the sea bed.
Figure 2A:
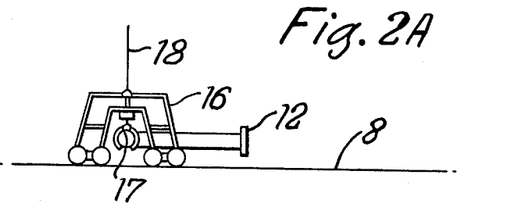
FIG. 2A is a cross section through the spool piece showing the spool frame standing on the sea bed straddling the spool piece and holding the latter in a clamp.
Figure 2B:
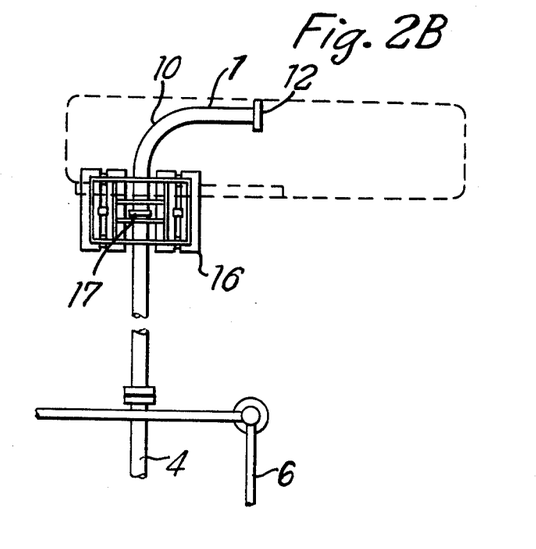
FIG. 2B is a plan view showing the position of the spool frame in relation to an elbow in the spool piece.
Figure 3:
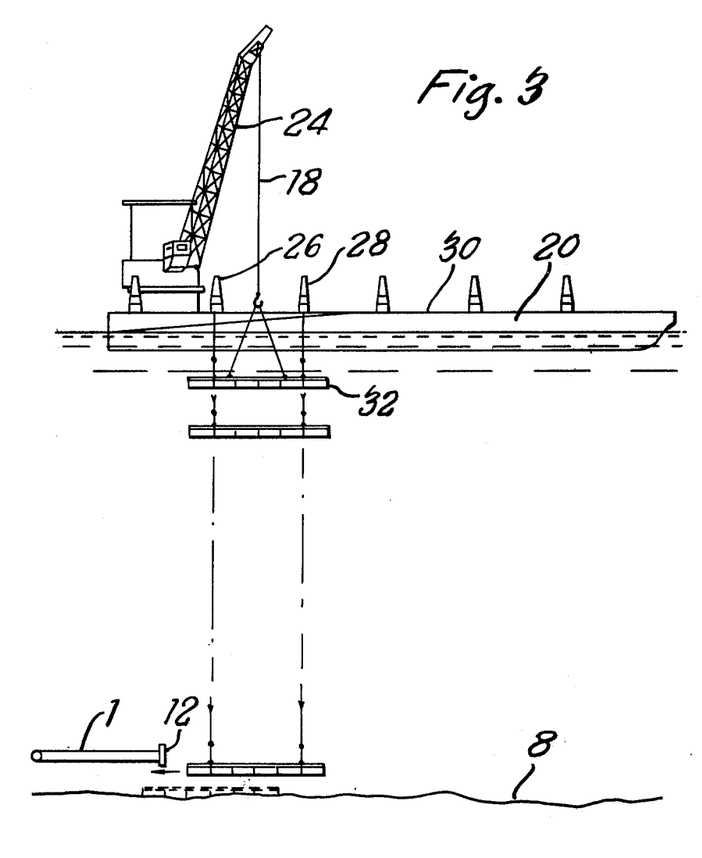
FIG. 3 is a side elevation showing the lowering from the vessel of a working platform to the sea bed and its final disposition on the sea bed.
Figure 4:
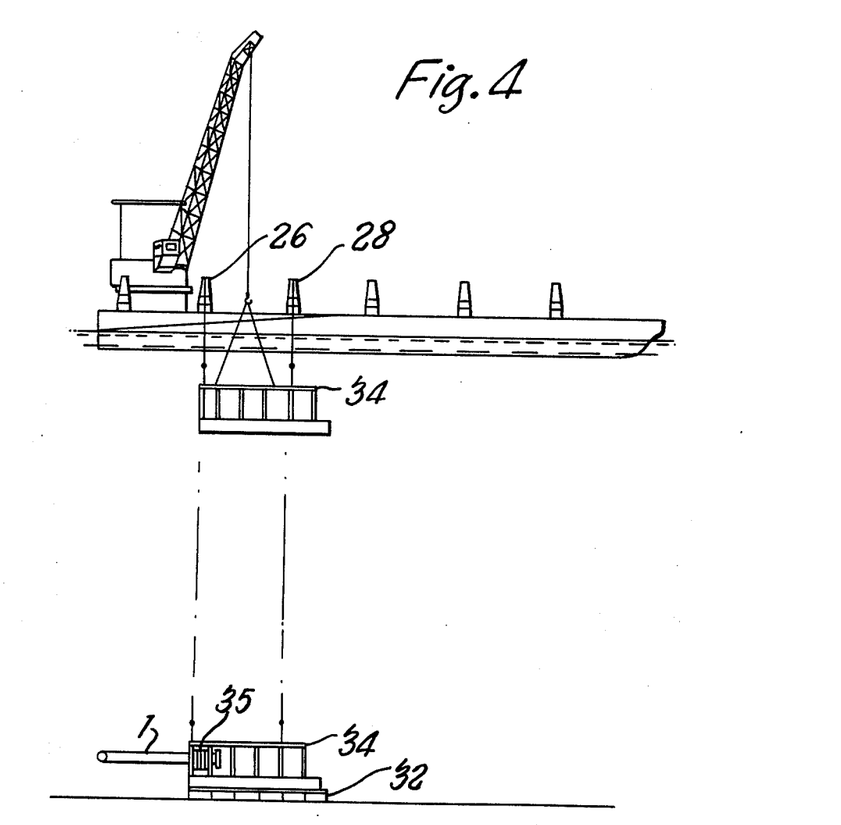
FIG. 4 is a side elevation showing the lowering from the vessel of a frame for aligning the two pipeline ends and supporting them in the aligned position herein referred to as the joining frame and its final disposition on the working platform on the sea bed.
Figure 5:
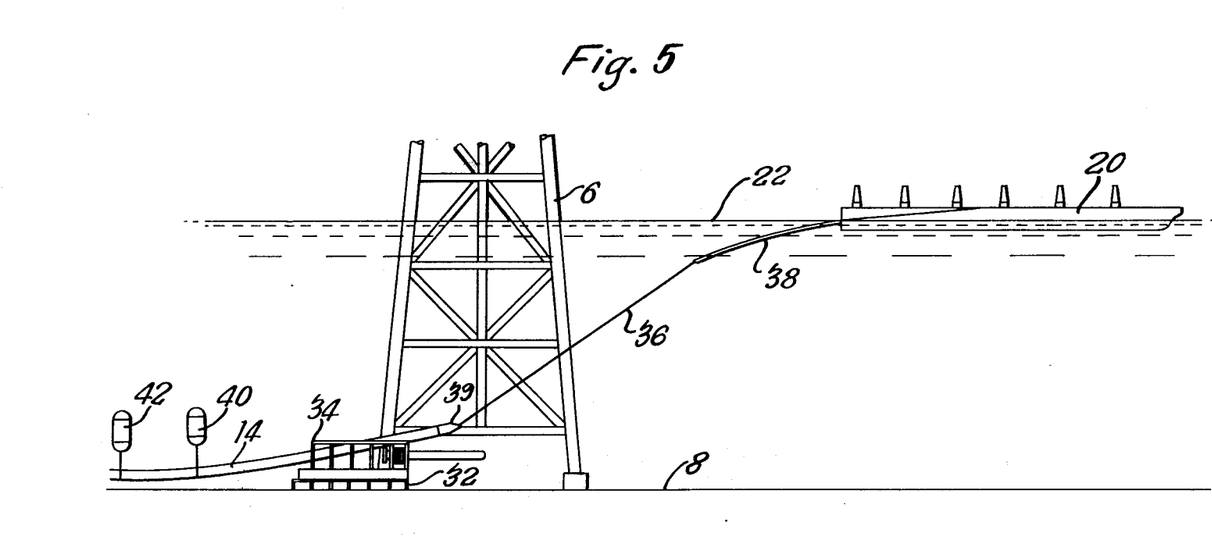
FIG. 5 is a side elevation showing the raising of the pipeline from the sea bed at an instant soon after the start of the raising operation.
Figure 6:
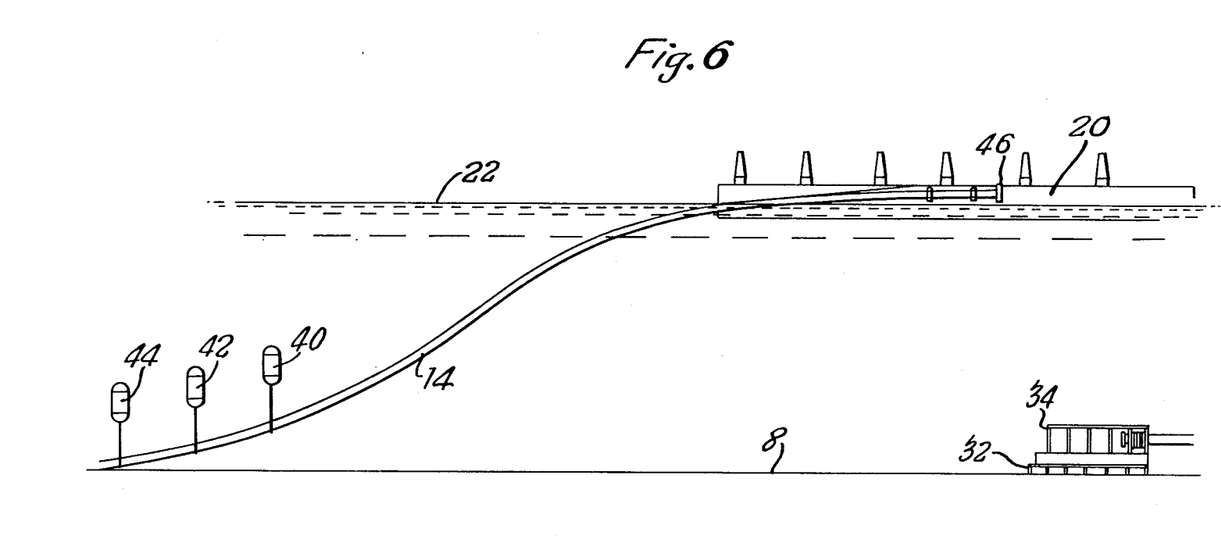
FIG. 6 is a side elevation showing the pipeline in the raised position for cutting to the correct length and welding onto a flange.

At the start of the method one pipeline to be joined is a capped spool piece 1 about 200 feet long extending from a riser 4 (to which the spool piece is joined at flange 5) of an offshore production platform 6 and lying on the sea bed 8. The capped end is a few feet from an elbow 10 in the spool piece and has a flange 12 welded thereto. The other pipeline to be joined is a pipeline 14, 32 inches in diameter and over 100 miles long, the end of which is also capped and lying on the sea bed 8. The two pipeline ends are about 100 feet apart and the axis of the pipeline 14 is approximately colinear with the axis of the portion of the spool piece 1 between the elbow 10 and the flange 12. The water depth is 400 feet.

The spool frame 16 is lowered on cables 18 from a vessel 20 on the surface 22 by first setting in the water employing an 800 ton crane 24 and once in the water transferring the cable to two davits 26 and 28 on the deck 30 of the vessel 20. The spool frame 16 is lowered until it stands on the sea bed 8 straddling the end of the spool piece 1 as close as possible to the elbow 10. A hydraulic clamp 17 attached to the spool frame 16 is used by divers to grip the spool piece 1 and using winches (not shown) on the deck 30 of the vessel to pull on the cable 18 the spool piece 1 is lifted about 6 feet off the water bottom 8. The cables 18 are then disconnected from the davits 26 and 28 and a working platform 32 lowered from the vessel (first using the 800 ton crane and then the two davits) until the platform is 2-3 feet above the sea bed. The vessel 20 is moved towards the stern until the working platform 32 is under the flange 12 of the spool piece 1. A frame 34 hereafter called the joining frame is then lowered using the crane 24 and davits 26 and 28 as previously described for the lowering of the spool frame and when the joining frame is a few feet from the bottom 8, it is positioned by divers so that the hydraulic clamp 35 is in correspondence with the straight part of the spool piece welded to the flange 12. Divers then attach the hydraulic clamp 35 to the spool piece 1.

Figure 8:
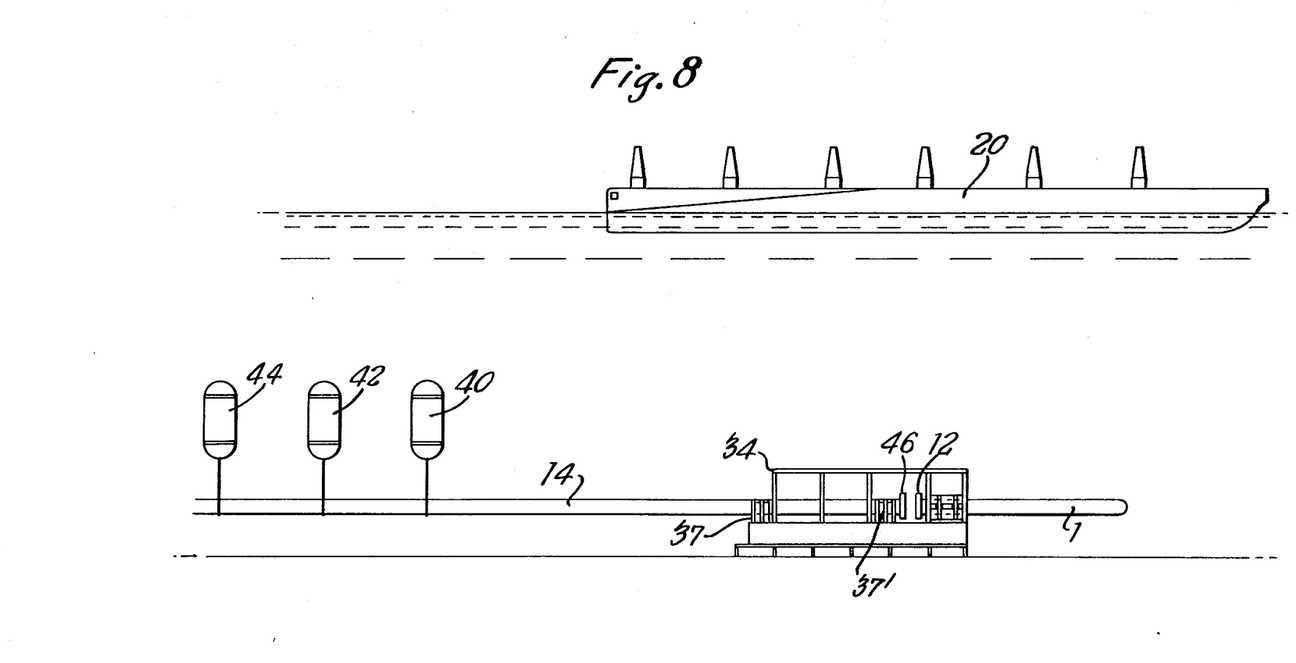
FIG. 8 is a side elevation showing the alignment of the flanges prior to bolting together.

Then a diver connects a pulling cable 36 to a pulling head 39 at the end of the pipeline 14 and the pipeline is raised to the surface 22 by means of the cable 36 and a stinger 38 supported from the vessel 20. After removing the head 39, 4 lengths of pipe each 40 feet in length are welded onto the raised end which is then capped and the pulling head 39 replaced. Floodable buoyancy tanks 40, 42 and 44 are then attached to the pipeline 14. The line 14 is lowered and the buoyancy tanks 40, 42 and 44 allowed to flood on entering the water and the line lowered alongside the joining frame 34 employing the stinger 38 and cable 36. Air is then pumped into the buoyancy tanks 40, 42 and 44 and the line 14 lifted employing the cable 36, and put over the joining frame 34, and the buoyancy tanks 40, 42 and 44 flooded. A diver then marks on the pipeline 14 the position of the flange 12 on the spool piece, the buoyancy tanks 40, 42 and 44 are refilled with air and the line 14 raised to the surface 22 and cut. A flange 46 is welded on, a pulling head 48 connected and the line 14 lowered back over the joining frame 34. Valves (not shown) on the head 48 are then opened to flood the line 14 and the pipeline supported out of alignment and the head 48 disconnected and lifted to the vessel 20. The line 14 is then lifted just over the saddle 37 and pulled down onto the saddle 39 by means of jacks. If there is any misalignment between the ends a diver can correct this using a half collar over the first saddle. The small gap between the flanges 12 and 46 (as shown in FIG. 8) is closed employing hydraulic jacks to draw flange 12 towards flange 46 and the flanges are joined together using pins and bolts. Then divers cut off both saddles 37 and 37' from the joining frame 34 and allow them to fall to the sea bed 8, then lifting cable 36 connected by shackles (not shown) to the frame 34 and the latter lifted to the vessel 20. The hydraulic clamp in the spool frame 16 is then opened and the pipeline allowed to settle on the sea bed 8, and the lifting cable 36 connected by shackles (not shown) to the frame 16 and the latter lifted to the vessel 20. The buoyancy tanks 40, 42 and 44 are then recovered.

Although the method described is particularly suitable for use where the water depth is over 200 feet it can, nevertheless, be used with advantage in shallower water.

We claim:

1. A method of connecting by means of flanges two pipelines lying on the bottom of a body of water which method comprises:

a. disposing a first pipeline having a flange at the end thereof so that the end portion of the pipeline is moveable in the direction of its longitudinal axis to provide adjustment for joining the flanges together, b. installing on the water bottom a spool frame, the spool frame having releaseable means for holding the end portion of the first pipeline free of the water bottom in a suitable attitude for installing a joining frame, and employing said spool frame to lift the first pipeline at a position a small distance from the end thereof, c. installing on the water bottom a joining frame, said joining frame having means for supporting the first pipeline and means for supporting a second pipeline having a flange at the end thereof in alignment therewith and, using said joining frame, supporting the first pipeline and supporting the second pipeline in alignment therewith, and d. connecting the flanges on the supported pipelines together in fluid tight relationship.

2. A method as claimed in claim 1. wherein at the start of the method only the first pipeline has a flange at its end and there is a gap between the ends of the two pipelines and which comprises lifting the end of the second pipeline to the surface and increasing the length of the second pipeline by an amount so that when the pipeline is lowered to the water bottom the ends overlap, lowering to the water bottom, determining the excess length, raising to the surface, removing the excess length, attaching a flange and lowering to the water bottom.

3. A method as claimed in claim 1. which comprises lowering the end of the second pipeline onto the means for supporting same in alignment with the first pipeline employing guide means on the joining frame.

4. A method as claimed in claim 1. wherein at the start of the method the second pipeline has a closure means on the end thereof and which comprises supporting the second pipeline in a non aligned position which permits removal of the closure means and removing same.

5. A method as claimed in claim 4 wherein the supporting of the second pipeline in a non-aligned position is effected employing a support means on the joining frame.

6. A method as claimed in claim 1. wherein the spool frame has a hydraulic clamp for holding the first pipeline and which comprises lowering the spool frame to the water bottom and holding the first pipeline by means of the hydraulic clamp and, lifting the first pipeline off the water bottom.

7. A method as claimed in claim 1. wherein the first pipeline has at a small distance from the end thereof a substantially right angle bend such that the end of the pipeline is moveable in the direction of its longitudinal axis by a force in a direction lateral with respect to the pipeline beyond the bend and which comprises installing the spool frame beyond, but close to, the bend.

* * * * *